(12) United States Patent
Engel

(10) Patent No.: US 6,832,733 B2
(45) Date of Patent: Dec. 21, 2004

(54) NOZZLE END CONFIGURATION

(76) Inventor: Harold J. Engel, 18932 Olympia St., Northridge, CA (US) 91326

( * ) Notice: Subject to any disclaimer, the term of this patent is extended or adjusted under 35 U.S.C. 154(b) by 0 days.

(21) Appl. No.: 10/342,430

(22) Filed: Jan. 16, 2003

(65) Prior Publication Data

US 2004/0140371 A1 Jul. 22, 2004

(51) Int. Cl.[7] .................. A01G 27/00; A62C 31/02; B05B 1/26; B65D 47/18; B67D 5/42
(52) U.S. Cl. .................. 239/145; 239/601; 222/420; 222/386
(58) Field of Search ................. 239/145, 601, 239/589, 329, 333; 222/420, 386, 388; 118/323, 410

(56) References Cited

U.S. PATENT DOCUMENTS

| | | | |
|---|---|---|---|
| 3,572,400 A | * | 3/1971 | Casner et al. .................. 141/1 |
| 3,572,558 A | * | 3/1971 | Hooker ........................ 222/420 |
| 3,677,447 A | * | 7/1972 | Rentz .......................... 222/630 |
| 3,810,779 A | * | 5/1974 | Pickett et al. ................ 427/256 |
| 4,133,918 A | * | 1/1979 | Simms et al. ................ 427/256 |
| 4,400,708 A | * | 8/1983 | Sachs ....................... 346/140.1 |
| 4,441,532 A | * | 4/1984 | Hrubesh ........................ 141/1 |
| 4,446,993 A | * | 5/1984 | Tokorozawa ................ 222/214 |
| 4,572,103 A | | 2/1986 | Engel |
| 4,941,428 A | | 7/1990 | Engel |
| 5,551,487 A | * | 9/1996 | Gordon et al. ................. 141/1 |
| 6,296,702 B1 | * | 10/2001 | Bryning et al. ............. 118/401 |

* cited by examiner

*Primary Examiner*—Michael Mar
*Assistant Examiner*—Darren Gorman
(74) *Attorney, Agent, or Firm*—Dennis A. Gross; The Hill Firm

(57) ABSTRACT

An ultra small quantity fluid dispenser having a needle like dispense tip terminating in an orifice is provided with an interior lumen diameter increasing counterbore at the orifice to reduce wicking of fluid being dispensed. A wicking wire may be positioned in the lumen extending from the orifice, the wire having a smaller diameter than the lumen resists wetting of the exterior of the nozzle tip by fluid being dispensed by the orifice.

9 Claims, 3 Drawing Sheets

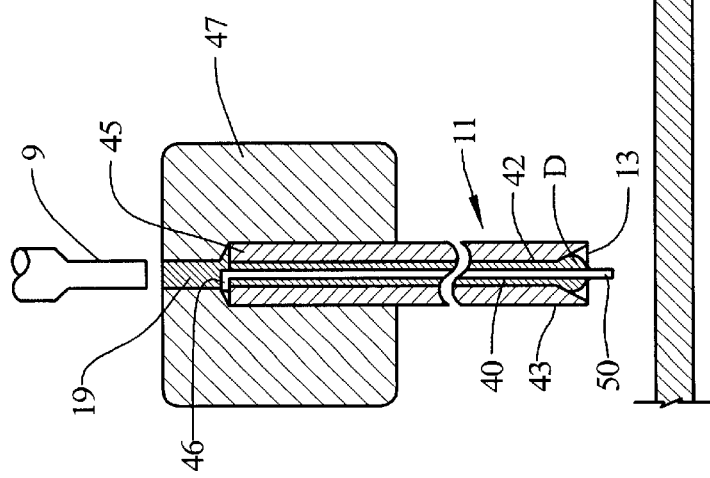

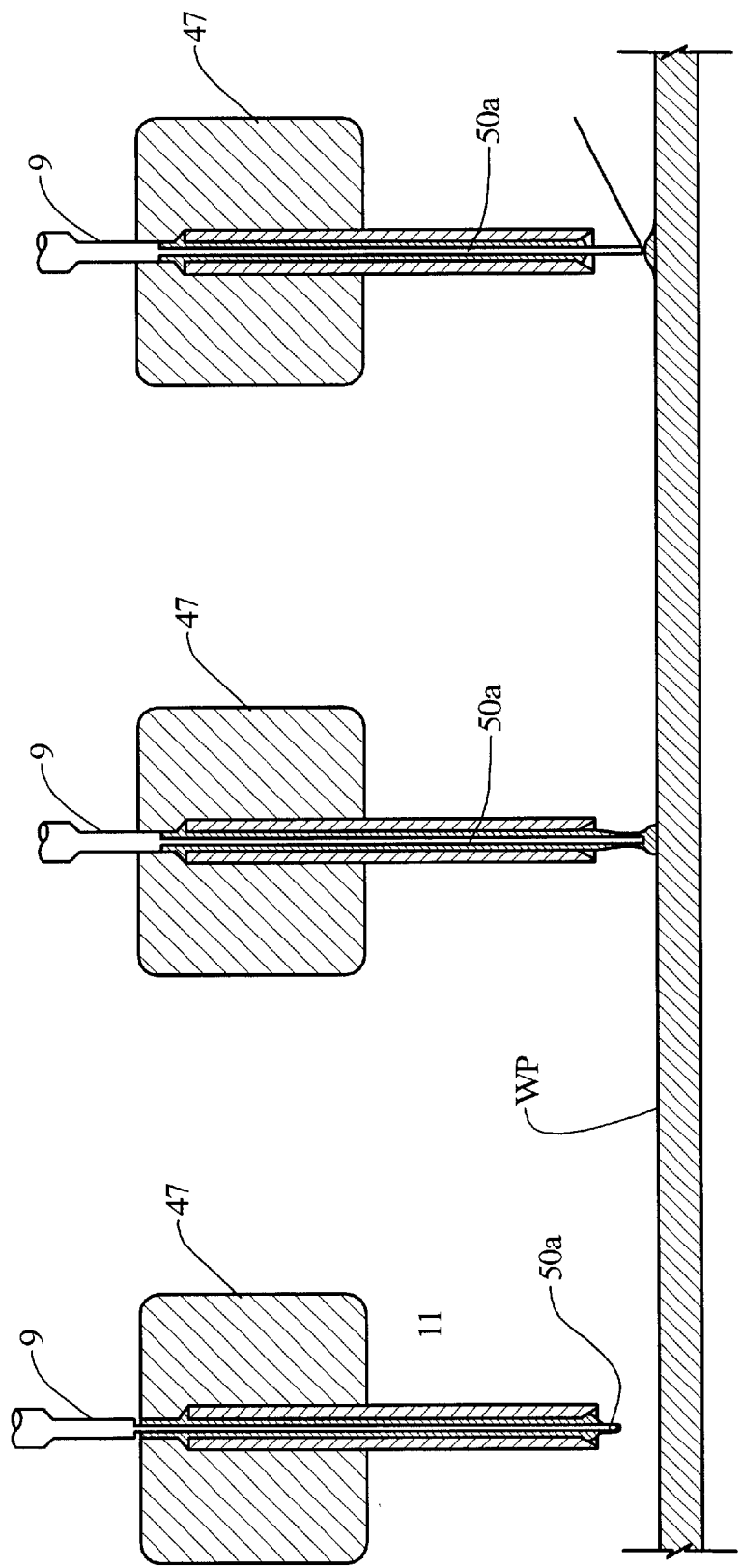

NOZZLE END CONFIGURATION

BACKGROUND OF THE INVENTION

1. Field of the Invention

This invention relates to dispensing systems and more particularly to small quantity discreet dot dispensing systems employing needle-like dispensing tips.

2. Description of Related Art

Ultra small quantity dispensing devices utilizing needle-like dispensing tips to dispense discreet drops, one at a time, are known. Such structures may employ axially movable pistons aligned with an axial bore or lumen in the dispensing tip which defines a dispensing orifice at an axial end thereof. The movement of the piston is controlled to dispense minute quantities onto a workpiece at a determined position. Such devices are shown, for example, in U.S. Pat. Nos. 4,572,103 and 4,941,428, the teachings of which are herein incorporated by reference.

A common difficulty associated with such drop at a time dispensers is the phenomenon known as wicking, or wetting, where the material being dispensed, instead of forming a discreet neat drop at the tip end, flows backwardly along the outside of the tip. This phenomenon is related to the viscosity of the material and materials having a low viscosity, and/or low surface tension, exhibit a greater tendency to wet the nozzle tip. When this occurs consistent repetitive volumetric controlled dispensing may be adversely impacted.

It would therefor be an advance in the art to provide a minute quantity discreet—drop dispenser employing a needle-like dispense tip which has a configuration to minimizing tip wicking.

It would be further an advance in the art to provide a minute quantity discreet drop dispensing tip which reduces tip wetting and enhances drop geometry formation and drop volume consistency.

These and other improvements are obtained by the following described invention.

SUMMARY OF THE INVENTION

A small volume dispense pump assembly is provided with a hollow dispense tip defining a dispense orifice at an axial end of the tip. In a preferred embodiment the tip is provided with a diameter increasing bore configuration adjacent the dispense orifice end of the tip. The diameter increase may be provided by a frustoconical inner diameter chamfer at the dispense end extending from the nozzle lumen inner diameter to approximately the tip's outer diameter.

In addition to enhancing the geometry of the tip's orifice, the tip may be provided with an interior wicking wire extending lengthwise of the lumen, at least at the dispense end portion and preferably projecting beyond the dispensing end of the tip. The wicking wire, preferably positioned centrally of the bore, may be attached to the tip for movement therewith or may be independent of the tip and moveable with respect to the tip. The provision of a wicking wire assists in reducing exterior flow of the fluid being dispensed upwardly along the outer diameter of the nozzle tip as the material tends to flow along the wire.

In an embodiment of the invention an enlarged inner diameter interior dimensions at the orifice of the nozzle tip permits the formation of a drop partially interially of the nozzle tip and partially externally beyond the tip end.

In an embodiment, the provision of an inner diameter enlarged area adjacent the tip orifice is combined with a wicking wire projecting into the enlarged diameter area.

In an embodiment a frustoconical inner diameter enlarging area is provided adjacent the tip orifice and a wicking wire extends axially of the nozzle tip extending into the frustoconical area.

In a further embodiment of the invention a nozzle tip frustoconical inner diameter increasing area is provided in the tip adjacent the orifice communicating to a tip lumen with a wicking wire axially positioned in the tip lumen and projecting through the frustoconical area terminating axially beyond the end of the tip.

It is therefore an object of the invention to provide an improved nozzle tip for minute quantity drop dispensing.

It is further an object of this invention to reduce nozzle tip outer diameter wicking in minute quantity drop dispensers.

It is another, and more particular, object of this invention to improve discrete dot dispensing utilizing needle-like dispensing nozzle tips by providing a tip lumen inner diameter increase adjacent the orifice of the nozzle tip.

It is another and more particular object of this invention to improve dot dispensing in minute quantity dispensers employing needle-like dispense tips by providing a frustoconical inner diameter lumen increase adjacent the orifice of the tip and by further providing a wicking wire positioned interior of the tip extending into the frustoconical area whereby tip outer diameter wicking is minimized.

These and other objects of this invention will become apparent to those skilled in the art from the following detail description of one preferred embodiments, it being understood that many variations will be apparent to those of ordinary skill in the art in substitution for the specific structures disclosed in the preferred embodiment.

BRIEF DESCRIPTION OF THE DRAWINGS

FIGS. 2A–2C are illustrative sectional views of a dispense tip having an increased diameter lumen adjacent the tip orifice and employing a fixed wicking wire.

FIGS. 3A–3C are views similar to FIGS. 2A–2C however employing a moving wicking wire fixed to the dispense piston.

DESCRIPTION OF THE PREFERRED EMBODIMENT

Figure 1:
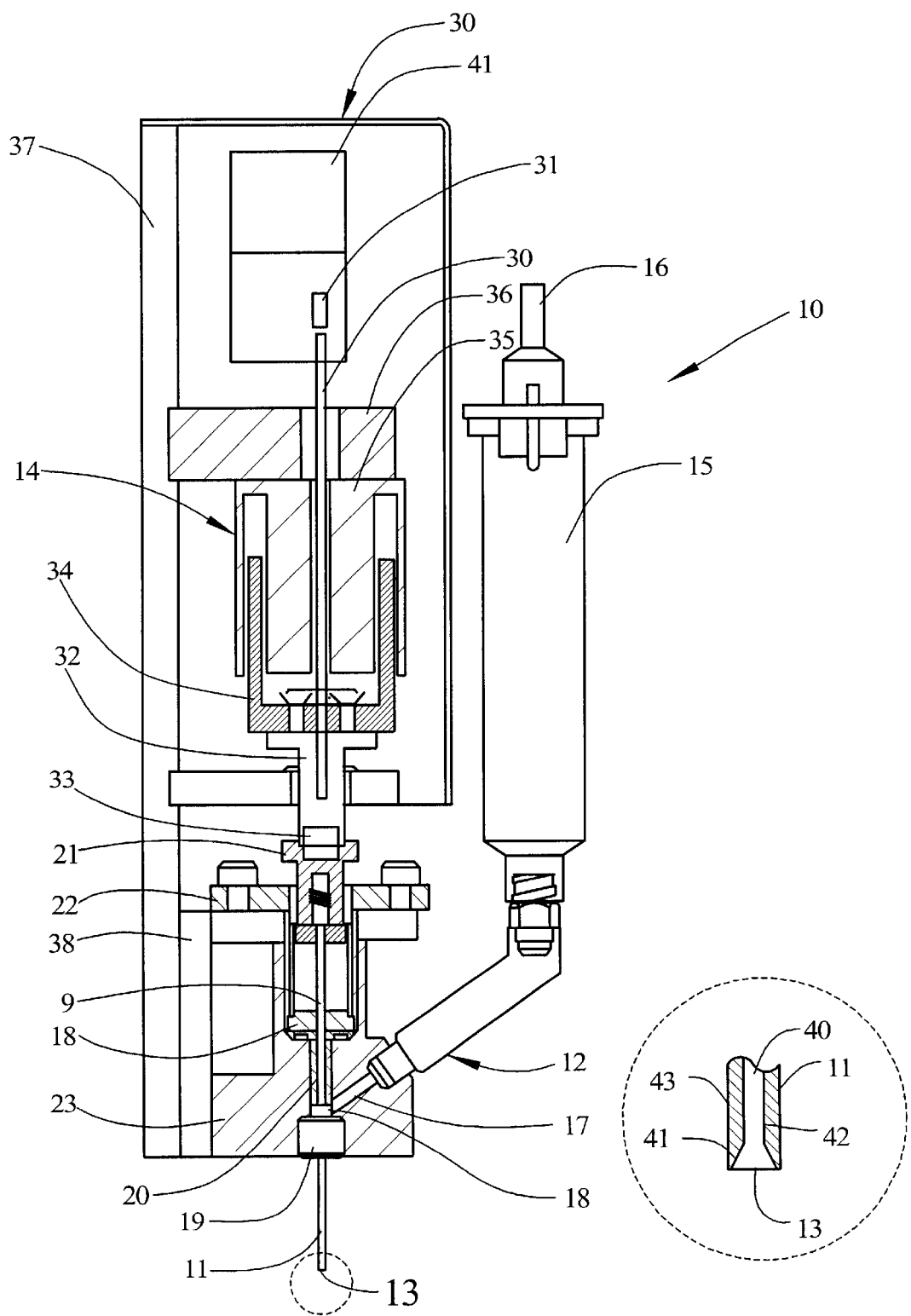
FIG. 1 is a schematic cross-sectional view of a minute quantity drop dispenser employing a needle-like dispense tip.

As shown in FIG. 1 a minute quantity drop dispenser 10 capable of dispensing extremely small volumes of material is provided with a needle-like dispensing tip 11 which terminates in a dispensing orifice 13. Such dispensers are used, for example, in the manufacture of electronic components such as circuit boards or micro-circuits to deposit minute quantities of liquid, semi-liquid and paste materials such as, for example, fluxes, solder paste, silver, conductive epoxies, encapsulants, fill materials, potting materials and the like ranging in viscosity from about 300 centipoise to several million centipoise. These materials may be dispensed with extreme rapidity with individual drops of material being dispensed at speeds, for example, from 10 to 100 dispensing actions per second. With individual dots on the order of 5 to 40 mils in diameter it is important that all of the material intended to be dispensed in a drop becomes dispensed and deposited on the workpiece's surface.

Accordingly, a reciprocating piston 9 driven by a linear actuator 14 may be employed to force material through the nozzle tip 11 and out of the orifice 13. In the structure illustrated, a material reservoir 15 which may be pressurized from a pressure source 16 dispenses material through a channel 17 to a pre-dispense chamber 18. The piston 9, reciprocating in a bushing 20, passes through the pre-dispense chamber 18 and into a pumping chamber 19. The pumping chamber 19 is open to the lumen of the hollow tip 11.

By using a controlled linear actuator 14, the piston can be reciprocated a stroke at a time or can be indexed in a pumping direction incrementally. A piston position indicator 30 may activate a sensor 31 which outputs to a computer program controlling activation of the linear actuator and a resultant controlled dispensing material flow. Although a linear actuator, which may be magnetically driven, has been referred to, it will be understood that dispensers of the type capable of employing the invention described hereafter may utilize any type of piston mover including cam drives, pneumatic drives, solenoid drives, mechanical lever drives or the like.

Although I have chosen to illustrate a piston drive dispenser, other micro quantity dispensers employing needle-like dispense tips are known and may benefit from this invention. Such alternative dispensing systems include: time-pressure syringes in which a syringe is provided with material and air or a plunger is applied to dispense the material through a tip; valve dispensers such as diaphragm valves, spool valves or needle valves; or rotary screw drives employing Archimedes screws or the like. Each of these structures exhibits a needle-like dispensing tip terminating in a dispensing orifice.

Common to such needle-like dispensing tips is the phenomenon of tip wetting, or wicking, in which the material to be dispensed migrates back along the outer diameter of the tip rather than forming a discreet drop at the orifice. This back migration adversely affects droplet formation and causes an excess of material to be carried on the outside of the tip. As the build-up continues, it reaches a point where it can become accretive to a dispensed drop. Additionally the material may inadvertently separate from the nozzle tip exterior and become deposited on a workpiece on an undesired area.

I have found that the tendency of fluids to wet or wick along the outer surface of a micro-dot dispensing tip can be reduced by increasing the inner diameter of the tip lumen at the dispensing orifice end of the tip. This permits the material to form a drip at least partially interiorly of the tip. As shown in FIG. 1 the tip 11 has an interior lumen or axial conduit 40, which terminates in an inner diameter increased area 41. This is illustrated in the figure as being frustoconical extending from the inner diameter 42 of the tube towards the outer diameter 43 at the orifice 13.

By utilizing a diameter increase adjacent the orifice, as the tip begins to form the drop, a portion of the fluid which will be released from the tip in a drop is formed into the drop's share partially within the diameter increased area. Due to the surface tension of the forming drop and the enlarged diameter increase, there is a lessened tendency for the fluid to wick back along the outer diameter 43 of the tube.

As illustrated in FIG. 2, this reduction in wicking can be enhanced by the provision of a wicking wire 50. The wicking wire extends axially of the lumen and can be attached to the tip, for example, at the top of the tip 45 where a bend 46 in the wicking wire 50 is shown as being entrapped between a top of the tip and a portion of the block 47 defining the pumping chamber 19. FIG. 2a also shows the drop D beginning to be formed in the diameter enlarging chamfer at the orifice 13 of the tip.

The wicking wire 50 may extend beyond the orifice 13 where it may come into close proximity to the surface of the workpiece WP. As shown in FIG. 2b, as the drop begins to form around the wicking wire, and contacts the surface of the workpiece, the drip will be drawn off of the wire 50. As the tip and wicking wire are withdrawn from the workpiece, a discreet dot 60 will be left on the surface of the workpiece. For fluids of lesser viscosity having a low wetting angle 61 for the deposited drop, the use of a diameter increasing nozzle end and/or wicking wire advantageously affects the drop deposit and minimizes tip outer diameter wetting.

Although FIG. 2 illustrates the use of a fixed wicking wire and a moveable tip, with the tip moving towards and away from the workpiece, it will be understood that a stationary tip may be used. Moreover as shown in FIG. 3 a wicking wire 50a may be provided affixed to the piston 9 and extending entirely through the lumen of the tip 11. In such a structure, as the piston begins its dispensing travel, the wicking wire will be moved toward the workpiece. The wicking wire movement will move the drop from the tip towards the workpiece along with the wicking wire. As the drop begins to contact the surface of the workpiece, it will flow from the wire to the workpiece. Movement back of the piston will then withdraw the tip. This type of affixed attachment of the wicking wire to the piston is particularly advantageous in those dispensers such as illustrated in FIG. 1 where the piston can be incrementally moved in a dispensing direction whereby droplets can be dispensed in succession without requiring a withdraw of the piston.

Although I have used the term wicking wire, it is to be understood that the device may be made of materials other than metal or wise. Additionally although I have shown the fixed wicking wire as being attached adjacent the top of the tip, it could be attached intermediate the tip ends or closer to the orifice.

Although I have shown my invention in connection with the description of certain preferred embodiments, it would be readily apparent to those of skill in the art that numerous alternatives may be utilized in place of the individual components I have chosen to illustrate. It would be further appreciated that the figures are intended to dramatically illustrate this invention are not drawings of an actual device.

I claim as my invention:

1. A minute quantity discrete drop dispenser comprising a dispense tip having a small diameter internal lumen terminating in a tip end orifice, the inner diameter of the lumen having a substantially constant dimension for a portion of its length and an increased inner diameter adjacent the orifice and extending to an axial end of the tip, a wicking wire fixed in the lumen extending at least through the increased diameter portion and extending to at least the orifice.

2. A device of claim 1 wherein the increased diameter is formed as a frustoconical chamfer.

3. A device of claim 2 wherein the increased diameter extends from the inner diameter of the lumen to adjacent the outer diameter of the tip.

4. A micro quantity discrete drop dispenser having a hollow needle-like tip terminating in a dispense orifice comprising a lumen in the tip communicating with the orifice, a fixed wicking wire in the lumen, the wicking wire extending beyond the orifice end of the tip, the lumen having an increased interior diameter section terminating at the tip.

5. A device of claim 4 wherein the wicking wire is disposed substantially coaxial of the lumen.

6. A device of claim 5 wherein the wicking wire is held at a fixed position relative to the tip area.

7. A drop dispenser having an elongated dispense tip open at one end to a dispense material containing chamber operatively coupled to a reciprocating piston, and having a dispense orifice at an opposite end, comprising a lumen extending between the chamber and the orifice, the lumen being counterbored at the orifice, a wicking wire fixably disposed in at least the counterbore portion of the lumen and extending through and exterior of the orifice.

8. A device according to claim 7 wherein the counterbore is frustoconical.

9. A device according to claim 7 wherein the wicking wire is substantially coaxial of the lumen.

* * * * *